United States Patent [19]

Aoyama et al.

[11] Patent Number: 4,512,559
[45] Date of Patent: Apr. 23, 1985

[54] LEAF SPRING CONSTRUCTION

[75] Inventors: Shigetsune Aoyama; Kazuo Yoshikawa; Yoshimichi Hasegawa; Junichi Higuchi, all of Aichi, Japan

[73] Assignees: Kabushiki Kaisha Toyota Chuo Kenkyusho, Aichi; Aichi Steel Works, Ltd., Tokai; Chuo Hatsujyo Kabushiki Kaisha, Nagoya, all of Japan

[21] Appl. No.: 518,766

[22] Filed: Aug. 1, 1983

Related U.S. Application Data

[63] Continuation of Ser. No. 256,784, Apr. 23, 1981, abandoned.

[30] Foreign Application Priority Data

May 1, 1980 [JP] Japan .................................. 55-58526

[51] Int. Cl.³ .............................................. F16F 1/18
[52] U.S. Cl. ...................................... 267/47; 267/158
[58] Field of Search ................. 267/7, 36 R, 40, 45, 267/47, 160, 158, 164, 44, 41

[56] References Cited

U.S. PATENT DOCUMENTS

| | | | |
|---|---|---|---|
| 152,841 | 7/1874 | Hall | 267/47 |
| 155,509 | 9/1874 | Evans | 267/47 |
| 779,020 | 1/1905 | Baldwin | 267/47 |
| 1,546,584 | 7/1925 | Hutt | 267/36 R |
| 1,730,700 | 8/1929 | Wallace | 267/47 |
| 1,813,617 | 7/1931 | Fries | 267/47 |
| 2,234,850 | 3/1941 | Wallace | 267/47 |
| 2,450,869 | 10/1948 | Berry | 267/47 |
| 2,533,511 | 12/1950 | Rowland et al. | 267/44 |
| 2,626,799 | 1/1953 | Howell | 267/47 |
| 2,932,506 | 4/1960 | Mather et al. | 267/47 |
| 3,490,758 | 1/1970 | Foster | 267/158 |
| 3,705,718 | 12/1972 | Fukui et al. | 267/47 |
| 3,814,410 | 6/1974 | Fukui et al. | 267/47 |
| 3,975,005 | 8/1976 | Duchemin | 267/47 |

FOREIGN PATENT DOCUMENTS

| | | | |
|---|---|---|---|
| 112436 | 8/1980 | Japan | 267/158 |
| 3972 | of 1879 | United Kingdom | 267/47 |
| 759773 | 8/1980 | U.S.S.R. | 267/47 |

OTHER PUBLICATIONS

*Webster's New Collegiate Dictionary*, (Springfield, Massachusetts: G. C. Merriam Co., 1979), p. 59.

*Primary Examiner*—Douglas C. Butler
*Assistant Examiner*—R. R. Diefendorf
*Attorney, Agent, or Firm*—Oblon, Fisher, Spivak, McClelland & Maier

[57] ABSTRACT

A leaf spring construction including at least one leaf element made from a flat sheet of uniform width and thickness, the leaf element having an arcuate shape in the transverse cross-section with a convex surface on tension stress side and a concave surface on compression stress side thereof, the leaf element having in cross-section a width b and a transverse center line forming an arc of a radius $r_c$ with the relation of $$2.0 \geq r_c/b \geq 0.64$$

and a thickness t with the relation of $$0.2 \geq t/b \geq 0.05$$

In a laminated leaf spring including a plurality of such leaf elements, each leaf element is formed to have a convex surface of a radius of curvature $r_o$ and a concave surface of a radius of curvature $r_i$ in the relation of $$1.2 \geq r_o/r_i \geq 1.0.$$

10 Claims, 38 Drawing Figures

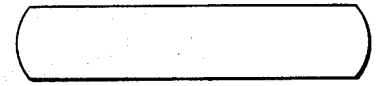
FIG.1 PRIOR ART
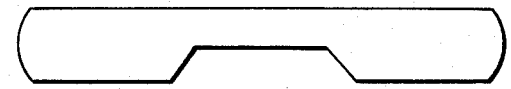
FIG.2 PRIOR ART
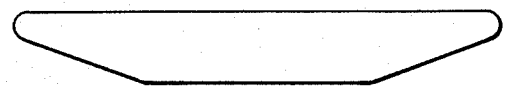
FIG.3 PRIOR ART
FIG.6
FIG.5
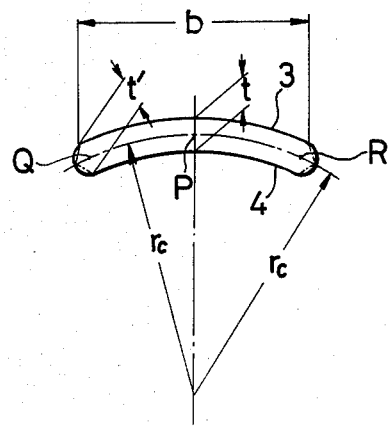
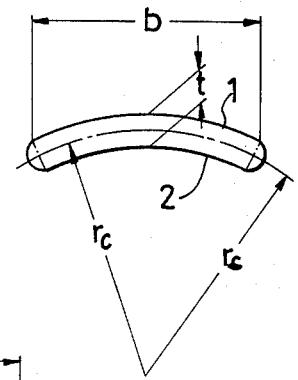
FIG.7
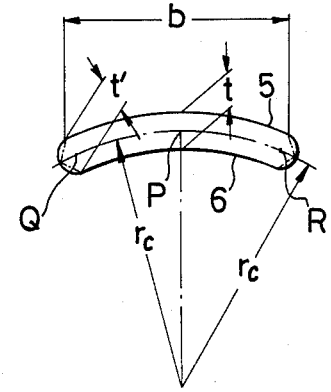

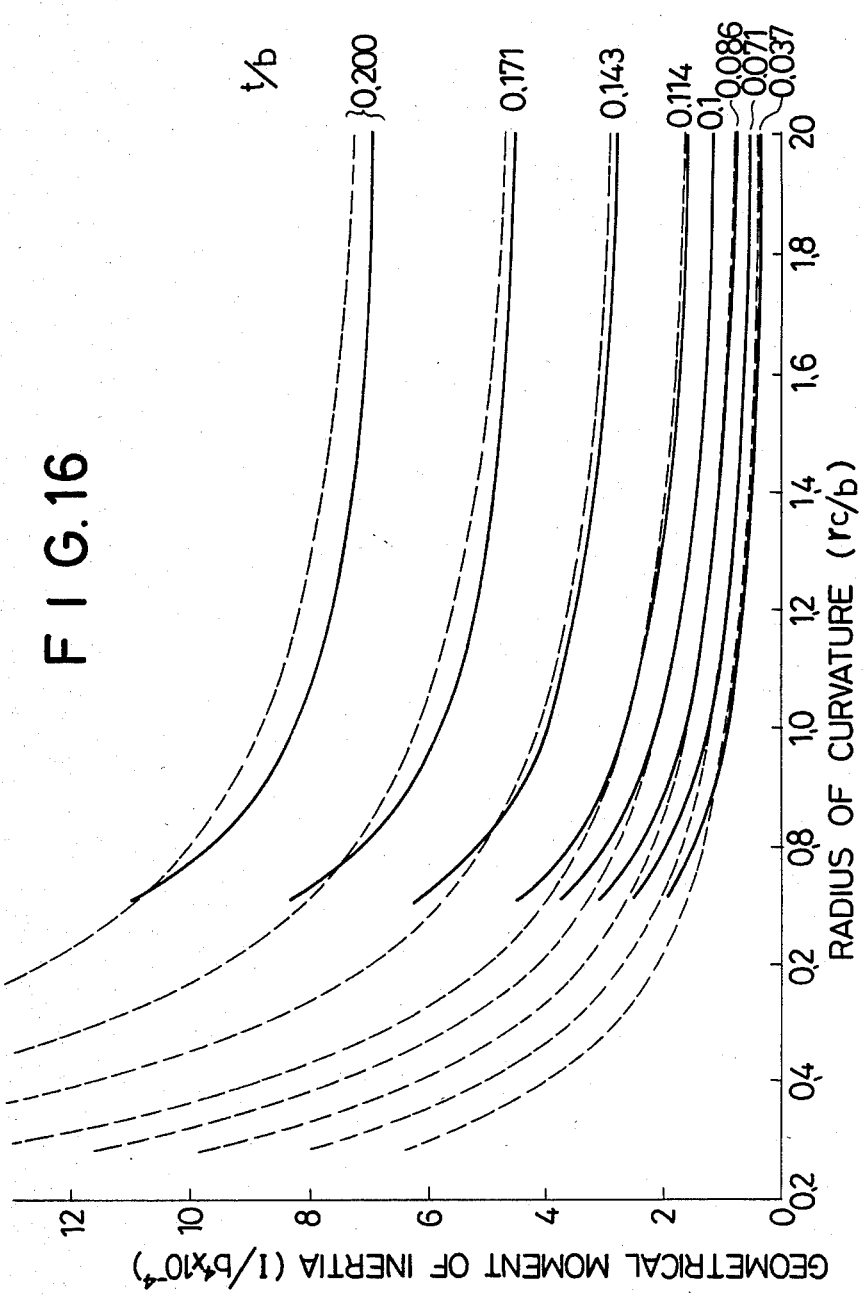

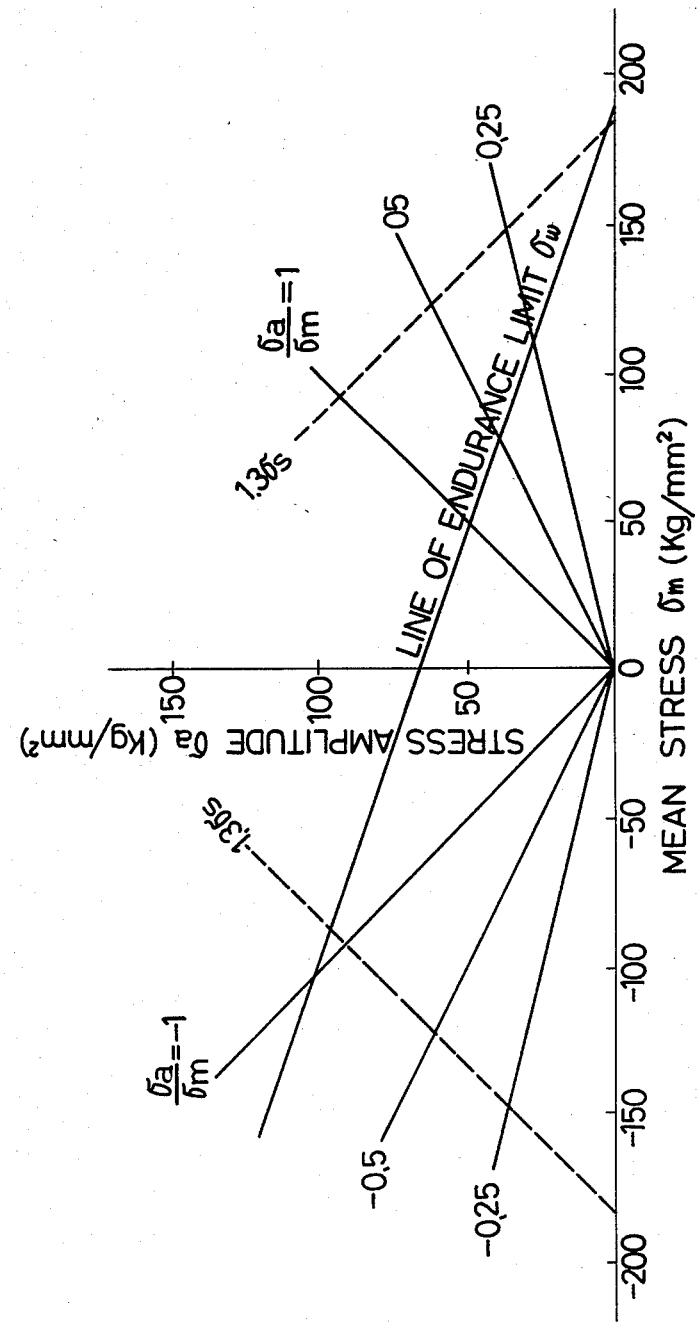

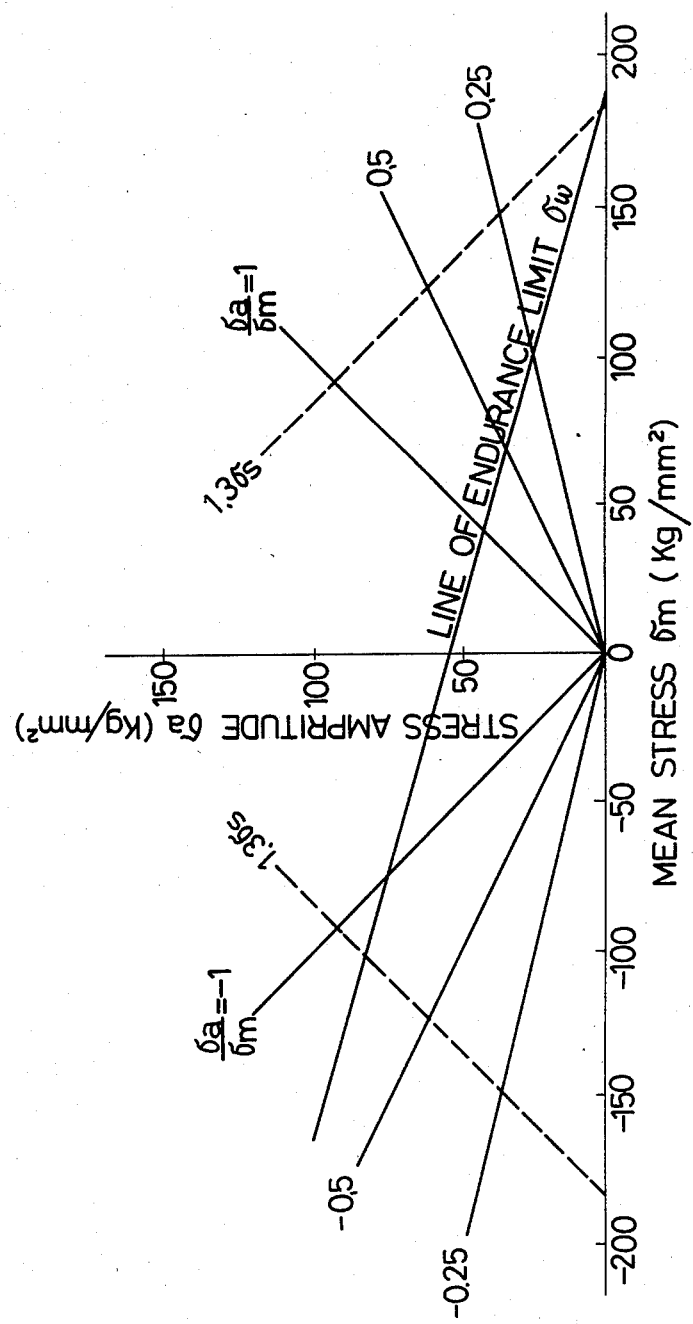

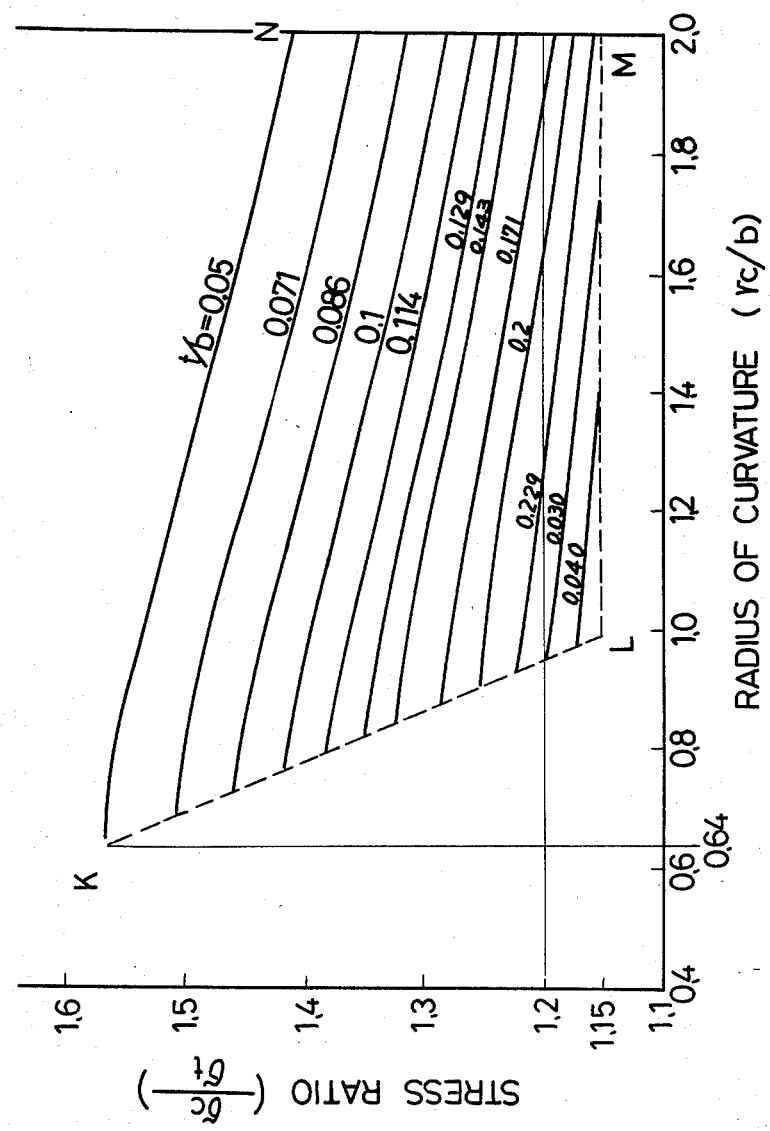

F I G. 24
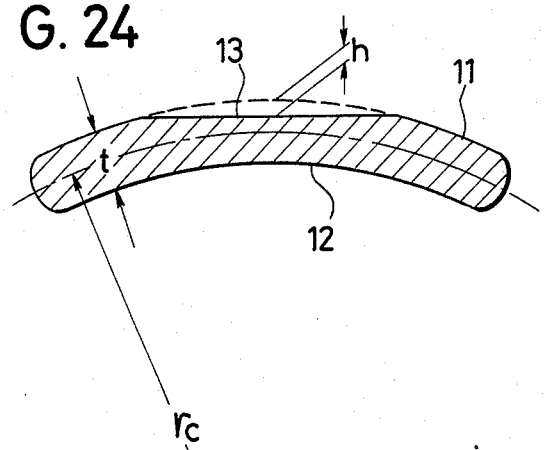
F I G. 23
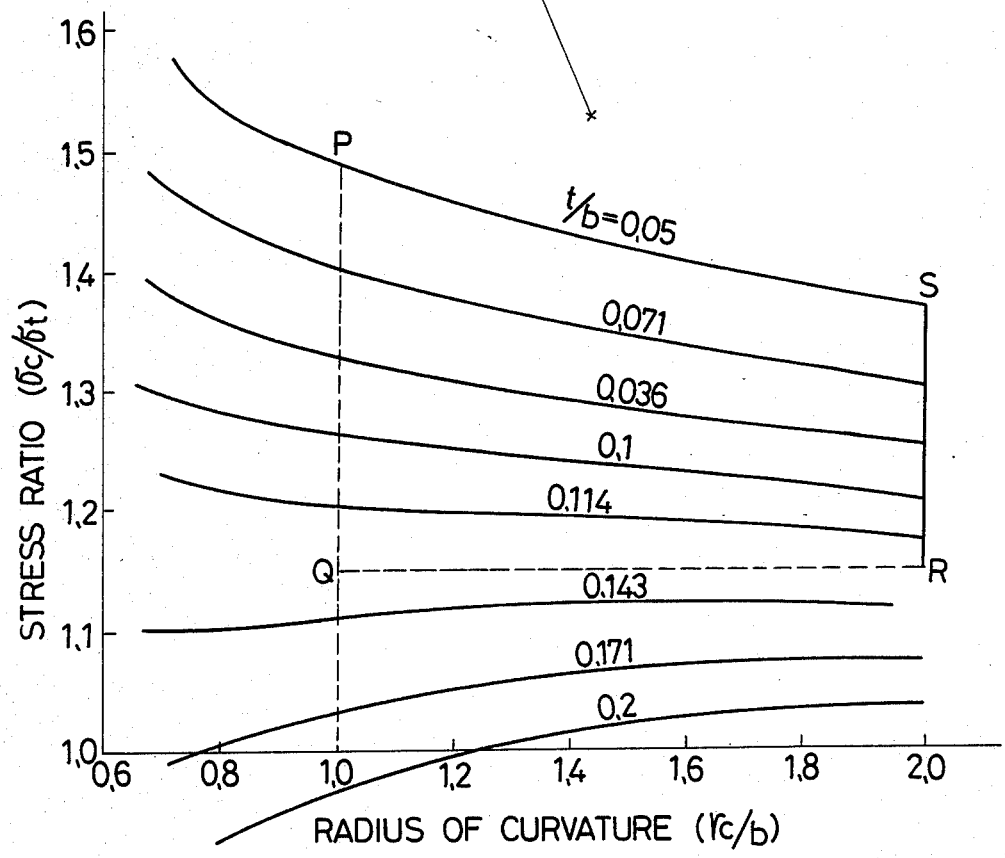

LEAF SPRING CONSTRUCTION

This application is a continuation of application Ser. No. 256,784, filed Apr. 23, 1981, now abandoned.

BACKGROUND OF THE INVENTION

1. Field of the Invention

This invention relates to improvements in and relating to a leaf spring element which is formed by rolling a strip of spring steel and a laminated leaf spring including a plurality of such leaf spring elements. The conventional leaf springs of this sort have a flat shape in cross-section along a plane perpendicular to the lengths thereof so that, upon exerting of a bending moment, concentrated stress occurs in corner edge portions of the loaded surface on the tension side, which can be the cause of fatigue failure in these corner edge portions. The present invention contemplates providing a leaf spring element which can be easily fabricated without incurring substantial changes in the conventional manufacturing methods for ordinary flat rolled steel strips and which is lightweight, high in fatigue strength and low in production cost. The present invention also provides a laminated leaf spring using a plurality of such leaf elements for its lamellar layers.

2. Description of Prior Art

In the production of leaf springs for the suspensions of vehicle axle shafts, it has been the general practice to use ordinary flat rolled steel strips which have a substantially rectangular shape in cross-section along a plane perpendicular to the longitudinal direction of the steel strip as shown in FIG. 1. In some cases a rolled flat steel strip of a channel-like shape with a groove on the bottom surface is employed, as shown in FIG. 2 in cross-section along a plane perpendicular to the length of the steel strip. A trapezoidal shape is shown in FIG. 3 in similar cross-section. A steel plate of the sectional shape shown in FIG. 2 or 3 is used for the leaf spring because it has a broader width on the tension stress side than on the compression stress side, as compared with the steel strip of a plain rectangular cross-section shown in FIG. 1, so that the neutral axis of the sectional area is shifted toward the tension stress side under a bending load thereby reducing the tension stress (increasing compression stress) under a bending moment and increasing the amplitude of the bearable repeated bending moment per unit weight. For example, a laminated leaf spring including a number of leaf elements of the cross-sectional shape shown in FIG. 2 or 3, which is widely used for the suspension of an axle shaft for vehicles, is subjected to a mean bending moment of static load as well as an amplitude of bending moment of dynamic load, and improvements in the fatigue strength per unit weight have been attempted by utilizing the fact that the fatigue strength is higher on the compression stress side of the beam than on the tension stress side under a mean bending moment by static load.

However, in comparison with the steel strip of a simple rectangular cross-sectional shape shown in FIG. 1, greater difficulties are involved in rolling leaf elements of a cross-sectional shape shown in FIG. 2 or 3 within a prescribed tolerance of errors, in addition to higher rolling costs. Further, the leaf elements with the cross-sectional shapes shown in FIGS. 1 to 3, have a common problem in that a fatigue fracture is apt to occur at the corner edge portions of the transverse cross-sectional shape on the tension stress side where concentration of stress takes place, exhibiting a fatigue strength about 20% lower than that of a round bar spring (spring having round cross-sectional shape) which has no such critical edge portion, as exemplified in FIG. 4. More specifically, FIG. 4 is a diagram taking the endurance limit as the ordinate and hardness as the abscissa, in which the endurance limit under rotating bending of a round bar spring is shown by a solid black circle and the endurance limit under plane bending of a flat steel spring is shown by a blank circle.

SUMMARY OF THE INVENTION

A primary object of the present invention is to provide a leaf spring element of a particular shape in cross-section which is designed to lower the stress on the tension stress side as compared with that on the compression stress side to preclude stress concentration at the corner edge portions of transverse section.

Another primary object of the present invention is to provide a leaf spring element which has a circularly arcuate shape with a convex surface on the tension stress side and a concave surface on the compression stress side in the transverse cross-section and in which the neutral axis is shifted toward the tension stress side to reduce the tension stress under a bending moment.

A further primary object of the present invention is to provide a laminated leaf spring including a plurality of leaf elements each having a circularly arcuate shape with a convex surface on the tension stress side and a concave surface on the compression stress side in the transverse cross-section, a convex surface of one leaf element being overlapped on an opposing concave surface of an adjacent leaf element.

A further object of the invention is to provide a laminated leaf spring of the sort mentioned above which is improved in flexural rigidity and fatigue strength per unit weight and in which the opposing convex and concave surfaces of adjacent leaf elements are contacted with each other in opposite side portions in cross-section to form a space at the apex portion of the convex surface, the overlapped leaf elements being clamped together in such manner as to cause widthwise elastic deformation to at least part of the leaf elements.

According to the present invention, the steel strip constituting the above-mentioned single leaf spring or each leaf element of the laminated leaf spring has a width b and a transverse center line of a radius of the curvature $r_c$ in the relation of $$2.0 \geq r_c/b \geq 0.64$$

to ensure higher rigidity and excellent fatigue strength per unit weight as compared with flat springs, coupled with accompanying effects such as reduction of irregularities in flexural rigidity due to errors in radius $r_c$ occurring during the fabrication process as well as reduction in weight.

The plate thickness t in the above-mentioned cross-section is held in the range of $$0.2 \geq t/b \geq 0.05$$

to improve the roll-forming characteristics, to enhance surety and efficiency and to utilize the margin of the fatigue strength on the compression side. If the ratio t/b exceeds 0.2, it becomes difficult to utilize the fatigue strength to a sufficient degree, while a ratio of t/b lower than 0.05 is beyond the limit of hot working and makes the forming operation difficult.

Further, the radius of curvature $r_o$ of the arcuately convex surface and the radius of curvature $r_i$ of the concave surface of the leaf spring are held in the range of $$1.2 \geq r_o/r_i \geq 1.0$$

so that a gap space of a predetermined width is formed between and at a median point along the width of the opposing convex and concave surfaces to prevent fretting and corrosion at the ends of center clamp and leaf ends of short leaf elements, ensuring improved fatigue strength. In a case where the ratio of $r_o/r_i$ is smaller than 1.0, the center portion of the convex surface is contacted with the concave surface of an adjacent leaf element, while a value in excess of 1.2 will result in a decreasing damping effect.

Further, a leaf spring is provided wit a flat surface on its center apex portion of the convex surface truncated parallel with a line connecting opposite ends of the leaf element in the transverse cross-section, the depth of truncation h relative to the leaf thickness t being $$0.35 \geq h/t \geq 0$$

The provision of the truncated surface contributes to lowering the geometrical moment of inertia with a modulus of section substantially similar as that of non-truncated leaf element, that is to say, to lowering the flexural rigidity alone without varying the stress or the fatigue strength, coupled with a practical advantage that surface flaws or decarburated layer can be removed by grinding or cutting the truncated surface.

Thus, the leaf element constituting the single or laminated leaf spring of the present invention is designed to have a higher flexural rigidity per unit weight as compared with the conventional flat leaf springs, at the same time effectively utilizing the margin of fatigue strength on the compression stress side by allotting a lower stress (mean stress, amplitude of stress) to the tension stress side than to the compression stress side as in the flat steel strips of the cross-sectional shapes shown in FIGS. 2 and 3. In addition, in contrast with the conventional flat steel strips, the leaf spring element according to the present invention avoids the danger of fatigue fracture which would occur at the apex portion of the convex surface on the tension stress side of the strip under mean bending load, precluding the notch effect as observed at the corner edge portions of transverse cross-section of the conventional flat steel strip under a bending load, while permitting a maximum allowable stress which will be expected from a particular kind of spring material against fatigue.

BRIEF DESCRIPTION OF THE DRAWINGS

The above and other objects, features and attendant advantages of the present invention will become apparent from the following detailed description and appended claims, taken in conjunction with the accompanying drawings in which like reference characters designate like or corresponding parts through various figures and wherein:

FIGS. 1 to 3 are transverse cross-sections of conventional flat leaf springs;

FIGS. 5 to 7 are transverse cross-sections of the leaf elements illustrating first, second and third embodiments, respectively, according to the present invention;

FIG. 16 is a diagram showing variations in the geometrical moment of inertia against the radius of curvature taking the plate thickness as a parameter;

FIGS. 19 to 21 are diagrams of endurance limit of repeated bending of various leaf springs;

FIGS. 22 and 23 are diagrams showing variations in the stress ratio to the radius of curvature taking the plate thickness as a parameter, in the aforementioned first and second embodiments;

FIG. 24 is a schematic sectional view of another embodiment of the leaf element constituting according to the present invention;

DETAILED DESCRIPTION OF THE PREFERRED EMBODIMENTS

Figure 4:
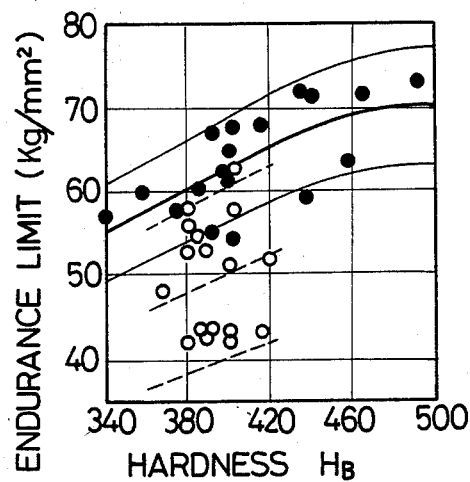
FIG. 4 is a diagram showing the rotating bending endurance limit of various spring steels and the completely reversed plane bending endurance limit of flat plate test pieces against hardness.

Referring to the accompanying drawings and first to FIG. 5, there is shown in the transverse cross-section a first embodiment of the leaf spring element to be used for the laminated leaf spring according to the present invention, with upper and lower surfaces 1 and 2 defined by two arcs of the concentric circles which have a difference in radius from each other by a measure corresponding to the plate thickness t.

FIG. 6 illustrates in the transverse cross-section a second embodiment of the leaf spring element to be used for the laminated leaf spring according to the present invention, with upper and lower surfaces 3 and 4 defined by arcs of the same radius.

FIG. 7 illustrates also in the transverse cross-section still another embodiment of the leaf element to be used for the laminated leaf spring according to the present invention, in which upper and lower surfaces 5 and 6 of the leaf spring element are defined by two arbitrary arcs of circle which permit no conspicuous variations in thickness of the plate in action.

The transverse center line of the leaf spring element of the first embodiment has a radius $r_c$ which is equal to the radius of upper surface 1 minus half the plate thickness t. The radius of the transverse center line in the second embodiment can be calculated in a similar manner, considering it as a radius of a circle which passes through a median point P of the plate thickness t at the center of the transverse cross-section and median points Q and R of the plate thickness t' at the opposite ends of the leaf spring element as shown in FIG. 6.

The upper limit of the ratio $r_c/b$ is set at 2.0 since leaf springs with an $r_c/b$ ratio below 2.0 are superior in spring constant and weight ratio to the conventional flat leaf springs, the leaf spring with an $r_c/b$ ratio greater than 2.0 being lowered to conventional levels in those characteristics. On the other hand, the reason why the lower limit of $r_c/b$ ratio is set at 0.64 is that if an $r_c/b$ ratio is set below 0.64, variations in the geometric moment of inertia attributable to dimensional errors in radius of curvature of the cross-sectional shape, which occur during the forming into arcuate shape from flat steel strip by roll forming, are great, so that it is difficult to obtain a leaf spring of desired characteristics.

Figure 8:
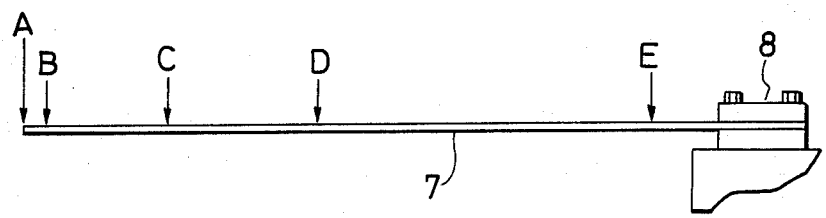
FIG. 8 is a schematic view showing measuring points in cantilever bending test.
Figure 9:
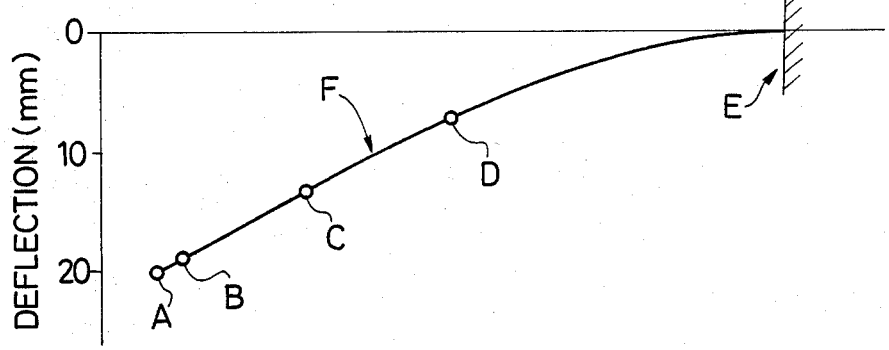
FIG. 9 is a schematic view showing deflection in cantilever bending of the leaf element of the present invention.
Figure 10:
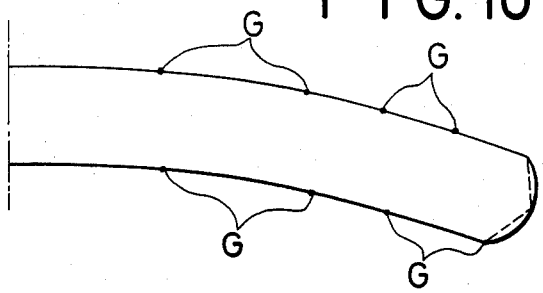
FIG. 10 is a schematic illustration showing gauge locations on a bisectioned area of the leaf element of the present invention.
Figure 11:
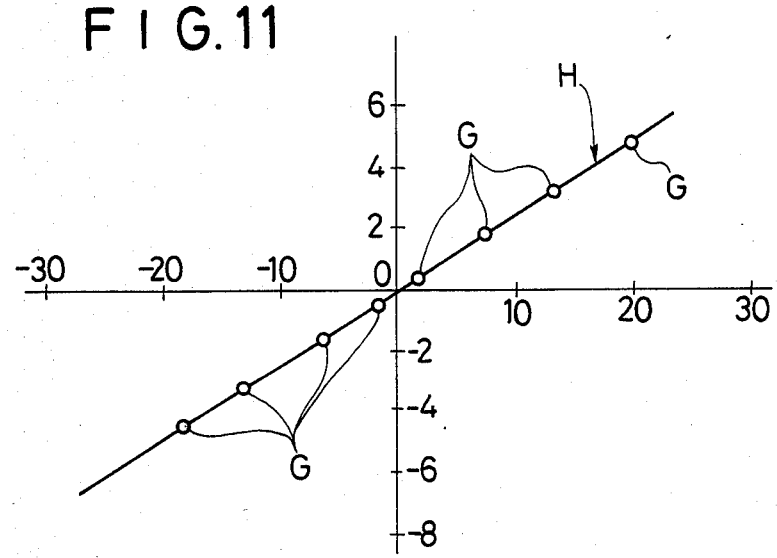
FIG. 11 is a diagram of stress distribution in the bisectioned area.

FIG. 8 shows a bending test of a leaf spring 7 of the second embodiment, which has a width b of 69.5 mm, a thickness t of 6.48 mm at a median point of its width and upper and lower surfaces 3 and 4 of a diameter of 91 mm. One end of leaf spring 7 is fixed on a support block 8 to form a cantilever of 600 mm in length and a static load is imposed on the fore end of the leaf spring for cantilever bending test. In the cantilever bending test, the deflection of the spring was measured at points A to E respectively at the distance of 600 mm, 580 mm, 475 mm, 350 mm and 60 mm from the supported end thereof. The test results are shown in Table 1, which closely corresponds to the values of the deflection of FIG. 9 (plotted by line F) which are calculated according to the beam theory. In the above-mentioned test, strain gauges are adhered at a number of positions on the surface of the leaf spring in a section along a vertical plane perpendicular to the length of the spring as shown in FIG. 10 for measuring stress at those positions. The results of measurement are shown in FIG. 11, plotting the points G against the distance from the neutral axis, which also closely coincide with calculated values of stress distribution (line H) according to the beam theory. These test results corroborate that the leaf spring element to be used for the laminated leaf spring according to the present invention can be handled as an elastic beam similarly to the conventional leaf springs of the cross-sections shown in FIGS. 1 to 3.

TABLE 1

| Measuring points (FIG. 8) | DEFLECTION | | | | | Deflection angle |
|---|---|---|---|---|---|---|
| | A | B | C | D | E | F |
| Dial gauge readings | | | | | | |
| (a) Base load (5 + α) | 42.22 | 40.00 | 7.63 | 4.60 | 1.27 | 107.5 |
| (b) Max. load (30 + α) | 12.93 | 12.21 | 28.20 | 17.14 | 1.92 | 136.2 |
| (a') Base load (after max. loading) | 42.12 | 40.08 | 7.68 | 4.64 | 1.27 | 107.6 |
| Deflection | | | | | | |
| (c) Deflection under 25 Kg (absolute value of (b) − (a)) | 29.29 | 27.79 | 20.57 | 12.54 | 0.65 | 28.7 |
| (d) Deflection Amended angle values | 540 $\tan\theta =$ 8.61 | 520 $\tan\theta =$ 8.27 | 415 $\tan\theta =$ 6.61 | 290 $\tan\theta =$ 4.62 | 0 | $\tan 2\theta =$ (1.362 − 107.5)/900 |
| Deflection | 0.65 | 0.65 | 0.65 | 0.65 | 0.65 | $\theta = 0.913°$ |
| (e) Deflection under 25 Kg after amendment ((c) − (d)) | 20.03 | 18.87 | 13.31 | 7.27 | 0 | |
| (f) Deflection by beam theory (W = 25 Kg) | 19.81 | 18.71 | 13.05 | 7.04 | | |
| (g) Comparative value ((f) ÷ (e)) | 0.99 | 0.99 | 0.98 | 0.97 | | |

Note:
The amended values at (d) are values for making the measuring point E a perfect cantilever.

Figure 12:
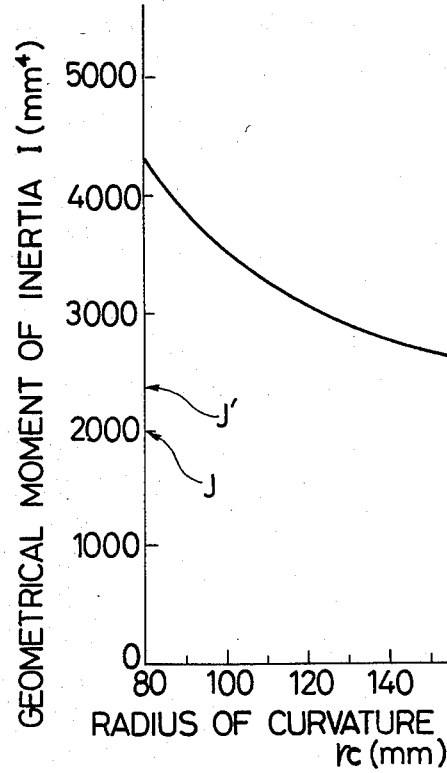
FIG. 12 is a graphic illustration of the geometrical moment of inertia against the radius of curvature of the leaf element according to the invention.
Figure 13:
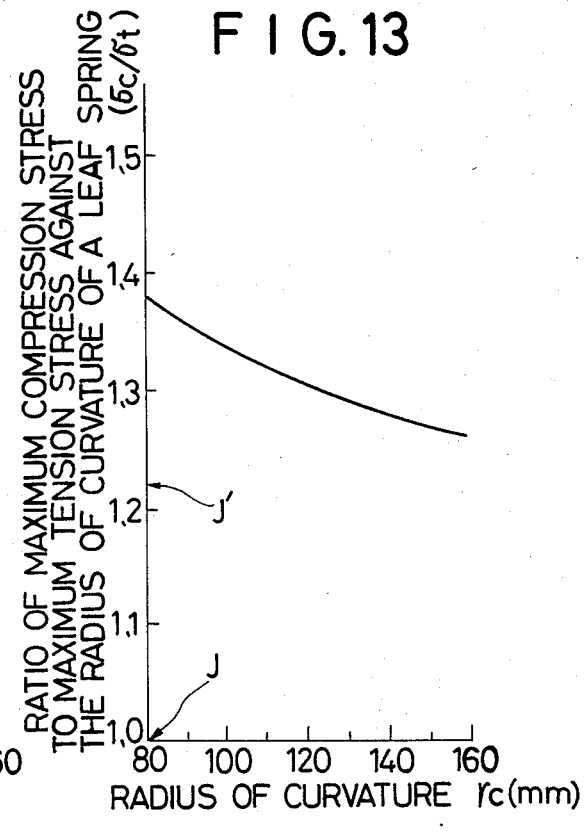
FIG. 13 is a diagram showing the ratio of maximum compression stress to maximum tension stress against the radius of curvature.

Now, consideration is given to the utility as a spring material of a single leaf element of arcuate cross-section to be used for the laminated leaf spring according to the present invention. FIG. 12 is a diagram showing variations in the geometrical moment of inertia against the radius of curvature of a leaf spring of arcuate cross-section which is formed from a 7 mm thick and 70 mm wide steel strip. The diagram of FIG. 13 shows variations in the ratio of maximum compression stress to maximum tension stress against the radius of curvature of a leaf spring of a similar arcuate cross-section, indicating for comparison at J the value of a flat steel strip of the same sectional dimensions and at J' the value of a flat steel strip substantially of the same sectional area with a channel-like groove on the compression stress side as shown in FIG. 2.

According to FIG. 12, the geometrical moment of inertia of the leaf element of the present invention is higher than that (about 2000) of the flat leaf spring and that (about 2400) of the grooved steel strip. This fact indicates the spring constant of the leaf element according to the present invention is high. However, as seen in FIG. 13, it is possible to hold the ratio ($\sigma_c/\sigma_t$) of the maximum compression stress to the maximum tension stress at a value higher than 1.0 of the steel strip of flat cross-section or about 1.22 of the steel plate of grooved cross-section. This is attributable to the fact that the maximum stress $\sigma_c$ on the compression stress side is higher than the maximum stress $\sigma_t$ on the tension stress side of bending, permitting utilization of the margin of fatigue strength on the compression stress side of bending relative to the tension stress side under a bending load as shown in Table 5 given below. Moreover, since the maximum tension stress occurs at the apex portion of the convex surface, it becomes possible to preclude completely the drop of the fatigue strength which would take place due to the notch effect at the corner edge portions in the transverse cross-section on the tension stress side of a flat strip or a flat strip with a channel-like groove.

Thus, the leaf spring element of arcuate cross-section to be used for the laminated leaf spring according to the present invention is higher in spring constant as well as in the value of $\sigma_c/\sigma_t$ ratio and fatigue strength as compared with non-grooved or grooved flat steel strips of the same width and same sectional area. It follows that the number of leaves can be reduced in a case where the leaf spring elements of arcuate cross-section are used for a laminated leaf spring in place of the conventional flat leaf springs of similar widths and sectional areas. As seen in FIG. 12, the geometrical moment of inertia in a leaf element having a radius of curvature of 120 mm is about 3200 (mm$^4$) which corresponds to the geometrical moment of inertia of a 70 mm wide flat leaf spring of a thickness of about 10 mm. Consequently, the plate thickness for a given spring constant can be reduced about 30% by substituting flat leaf spring with leaf springs of arcuate section. In addition, since the stress ratio is about 30% higher than that of the conventional flat leaf springs of the same sectional dimensions as shown in FIG. 13, the laminated leaf spring according to the present invention is considerably reduced in weight per unit load as compared with conventional non-grooved or grooved flat leaf springs of similar spring characteristics.

Next, the average life of the leaf elements of arcuate cross-section according to the present invention was determined by fatigue test in comparison with the conventional flat leaf springs manufactured under the same conditions. The test results are shown in Table 2 along with the dimensions and number of tested leaf springs. The test pieces of the indicated dimensions were prepared from the steel material of JIS SUP6 and subjected to pulsating fatigue test by a uniform bending fatigue machine with constant deflection with a mean stress of 65 kg/mm$^2$ and a stress amplitude of 55 kg/mm$^2$ on the mean tension side. The hardness of the test pieces was BHD3.05 after thermal treatments, more particularly, after a shot peening treatment on the surfaces subsequent to quenching and tempering under the same conditions. The test pieces according to the invention had the upper and lower surfaces thereof formed concentrically in the transverse cross-section as in the first embodiment described hereinbefore.

TABLE 2

| Test pieces (symbols common to FIG. 14) | Dimensions | | | |
|---|---|---|---|---|
| | Width b (mm) | Thickness t (mm) | Radius of arc passing through center of thickness $r_c$ (mm) | Number of tested pieces |
| Invention | | | | |
| No. 1 (○) | 70 | 7 | 80 | 5 |
| No. 2 (□) | 70 | 7 | 120 | 3 |
| No. 3 (△) | 70 | 8 | 100 | 4 |
| No. 4 (▲) | 70 | 8 | 120 | 5 |
| Conventional | | | | |
| No. 5 (●) | 70 | 7 | — | 12 |
| No. 6 (♦) | 70 | 8 | — | 13 |

Figure 14:
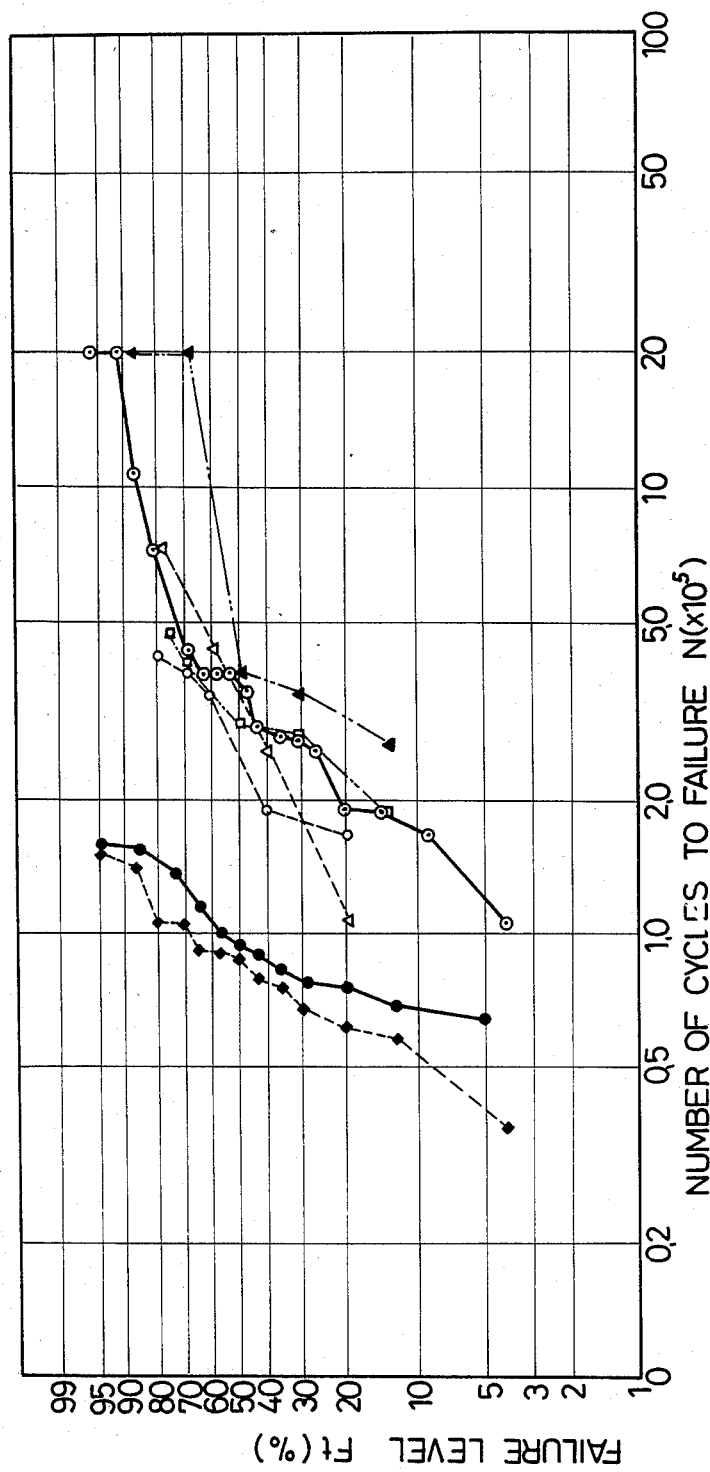
FIG. 14 is a diagram showing the results of fatigue test.

The results of the fatigue test are shown in FIG. 14, from which it is seen that the leaf element of arcuate cross-section according to the invention has a four times longer life than the conventional flat leaf springs. It should be noted that the convex side of each leaf element of arcuate cross-section was located on the tension stress side in the fatigue test. In FIG. 14, a line connecting symbols ( ● ) indicates the failure level of the entire number of leaf element of arcuate cross-section according to the invention.

Figure 15:
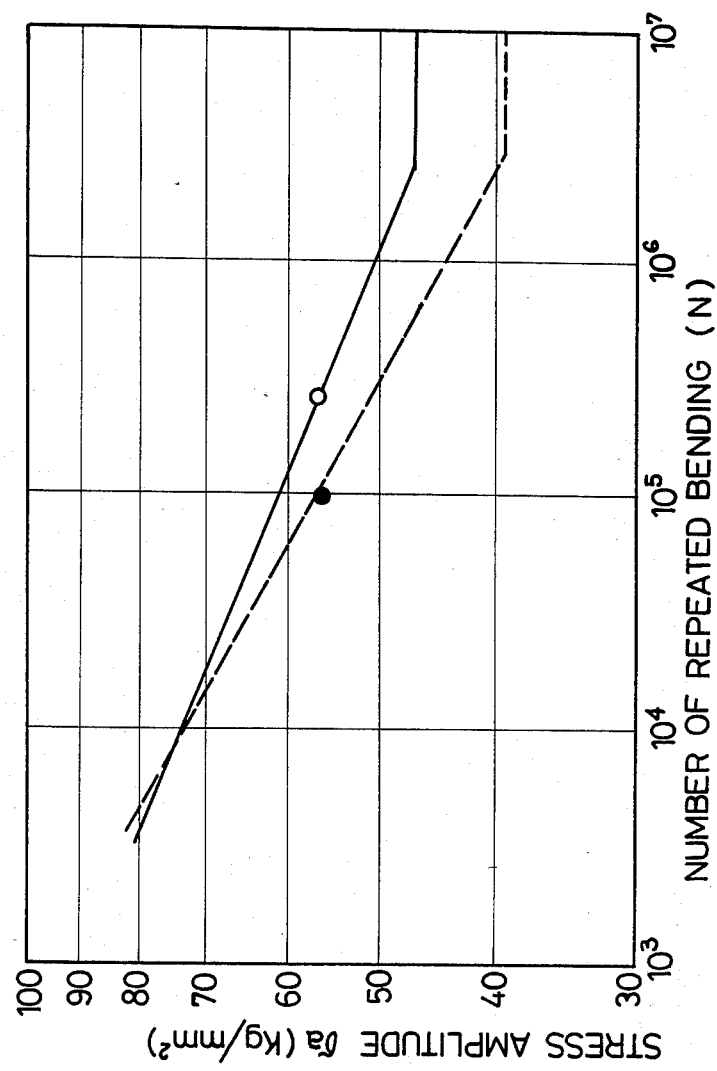
FIG. 15 is an S-N diagram.

In consideration of the hardness of the decarburized surface layer on the test pieces, the number of repeated cycles at 50% failure level in the above-mentioned fatigue test are plotted on a known repeated bending S-N diagram of a decarburized round bar and flat strip (FIG. 15) assessed by known procedures. As seen therefrom, white blank circle symbol (o) indicative of the average repeated number of fractures of entire arcuate cross-section specimens is on a solid line which represents the decarburized round bar, while a solid black circle symbol (●) indicative of the repeated number of flat leaf springs is on a broken line which represents the decarburized flat strip. The foregoing test results reveal that the arcuate cross-sectional leaf spring has a fatigue strength comparable to that of a round bar as a result of the shift of location of the maximum tension stress to the apex portion of the convex surface of the tension stress side and elimination of fatigue fracture due to the notch effect at the corner edge portions of transverse cross-section of a non-grooved or grooved flat steel strip. In addition, the arcuate cross-sectional leaf springs give rise to no problem in the shot peening treatment which is usually adopted to strengthen the decarburized surface layer on the tension stress side after thermal treatment of hot-rolled spring steel material, although it is difficult to effect shot peening at the corner edge portions in the transverse cross-section of the flat leaf spring. More particularly, with arcuate cross-sectional leaf spring elements, shot peening can be easily effected on the convex surface of large radius of curvature, particularly at the apex portion which is most critical with regard to the fatigue fracture. Blasting shots at right angles against the critical apex portion produces the peening effect to a sufficient degree.

As is clear from the foregoing description, the arcuate cross-section leaf spring element is superior to the conventional flat-rolled leaf springs in flexural rigidity and fatigue strength. However, in order to enhance the flexural rigidity and fatigue strength per unit weight, it is necessary to suitably determine the sectional shape of the leaf spring element in consideration of the spring characteristics per unit weight. Although the arcuate cross-sectional spring element can be formed from a flat rolled steel strip, large variations in the geometrical moment of inertia attributable to dimensional errors in the radius of curvature in both arcuated surfaces obviously occur when forming a flat rolled steel strip with a great thickness into an arcuate cross-sectional shape by rolling operations.

FIG. 16 is a diagram showing on the ordinate the geometrical moment of inertia in the first and second embodiments in a dimensionless expression of $I/b^4$ and on the abscissa the radius of curvature expressed in a dimensionless form of $r_c/b$ which is the radius ($r_c$) of the transverse center line of the cross-section divided by the plate widths (b), taking as a parameter the plate thickness as divided by plate width for expression in dimensionless form of (t/b). From the above-mentioned standpoint, the radius of curvature $r_c/b$ for a smaller plate thickness t/b is preferred to be in the range of $$r_c/b \geq 0.64$$

and for a larger plate thickness t/b preferred to be in the range of $$r_c/b \geq 1.0$$

In the diagram of FIG. 16, broken lines are plots of leaf spring elements of the first embodiment while solid lines are plots of leaf spring elements of the second embodiment.

Figure 17:
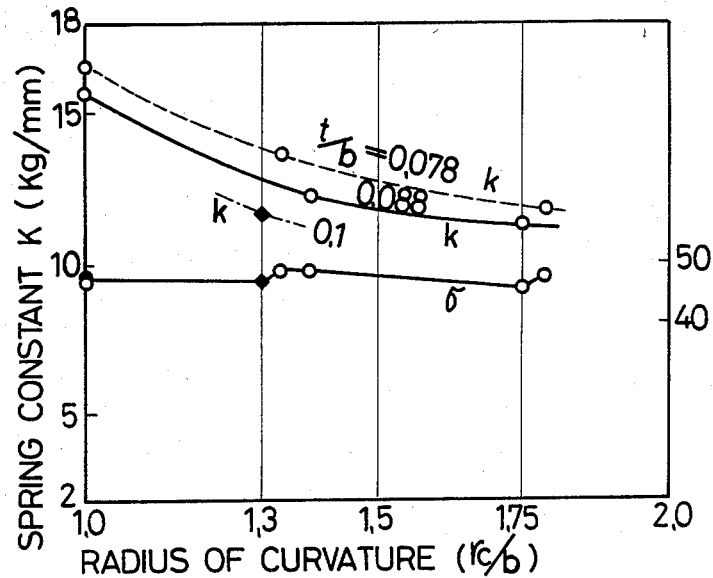
FIG. 17 is a diagram showing variations in spring constant and stress in relation with the radius of curvature taking the plate thickness as a parameter.
Figure 18:
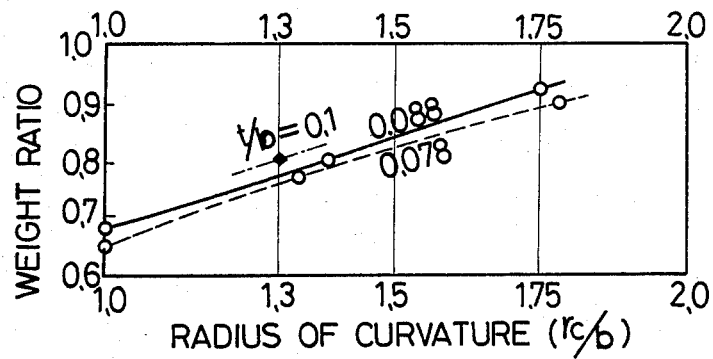
FIG. 18 is a diagram showing variations in weight ratio against the radius of curvature.

For comparison with a rolled flat leaf spring having a width of 70 mm and a thickness of 8 mm (spring constant=10 kg/mm, normal stress=42 kg/mm²) which is used for the suspensions of the axle shaft of the truck calculated values of spring constant and stress in leaf spring elements of arcuate cross-section having the dimensions indicated in Table 3 along with weight ratio to the flat rolled leaf springs are plotted in the diagrams of FIGS. 17 and 18. Namely, the leaf spring elements of an arcuate cross-section have a higher spring constant and a smaller weight than the conventional flat leaf springs under conditions with regard to the equivalent stress on the tension side, thus approaching the flat leaf springs with a greater plate thickness (t/b).

TABLE 3

| Symbols common to FIG. 17 & 18 | b (mm) | $r_c/b$ | t (mm) | t/b |
|---|---|---|---|---|
| ◆ | 70 | 1.29 | 7 | 0.1 |
| ○ | 80 | 1.75 | | 0.088 |
| ◐ | | 1.38 | | |
| ⊖ | | 1.0 | | 0.078 |
| ◑ | 90 | 1.78 | | |
| ◎ | | 1.33 | | |
| ● | | 1.0 | | |

As seen in FIGS. 17 and 18, the spring constant and weight ratio become almost equivalent to those of the conventional flat rolled leaf spring at a radius of curvature ($r_c/b$) of 2.0, so that the upper limit of the radius of curvature ($r_c/b$) of the arcuate cross-sectional leaf spring element should be placed at 2.0. The effect of weight reduction as compared with the conventional leaf spring disappears when $r_c/b$ is greater than 2.0.

TABLE 4

| | Hardness Hv | | Surface residual stress (kg/mm²) | |
|---|---|---|---|---|
| | Inner hardness | At 0.02 mm under surface | Tension side | Compression side |
| Unnotched, non-decarburized round bar specimen | 450 | (450) | — | — |
| Round bar specimen with decarburized surfaces | 450 | 351 | — | — |
| Round bar specimen with decarburized surfaces treated by shot peening | 450 | 351 | −30 | −6 |

Figure 21:
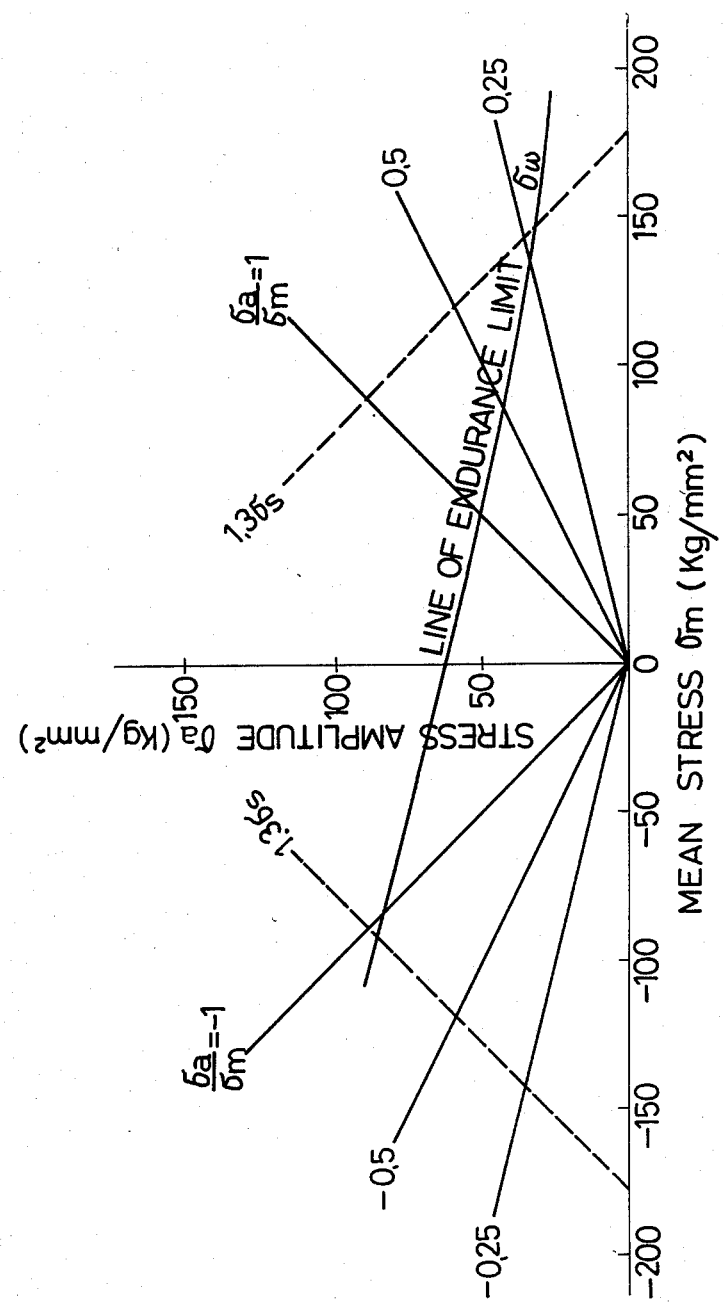

FIGS. 19 to 21 are the diagrams showing endurance limit of the three kinds of round bars of structural steel with different surface properties (see Table 4) in repeated bending under mean bending moment after quenching and tempering, assessing their structure, hardness and residual stress according to known methods. FIG. 19 is a diagram showing endurance limit of unnotched non-decarburized round bar specimen, FIG. 20 of round bar specimen with decarburized surfaces, and FIG. 21 of round bar with decarburized surfaces treated by shot peening. In these figures, the area bounded by a line of endurance limit and a line of bending yield strength represents the practical stress range of use. As illustrated, the fatigue strength has a greater margin on the compression stress side of mean stress than on the tension stress side under mean bending moment. Since suspension springs are generally used under partly pulsating or fluctuating state, lines of $\sigma_a/\sigma_m$ ratio (stress ratio) of the stress amplitude $\sigma_a$ to mean stress $\sigma_m$ are also plotted on the diagram to show the stress condition at $\sigma_a/\sigma_m = \pm 1$, $\pm 0.5$ and $\pm 0.25$ (the positive and negative figures respectively correspond to the surfaces on the tension and compression sides under mean bending moment).

Of these lines of stress ratio, endurance limit and bending yield strength, the critical points were read out by way of the amplitude of the stress of lower level, as shown in Table 5 along with the ratio $\sigma'_c/\sigma'_t$ of the critical stress $\sigma'_t$ on the tension stress side to the critical stress $\sigma'_c$ on the compression stress side, which is $$\sigma'_c/\sigma'_t = 1.15 - 1.88$$

TABLE 5

| Material | Stress ratio ($\sigma_a/\sigma_m$) | Tension stress side | | Compression stress side | | Allowable stress ratio ($\sigma'_c/\sigma'_t$) |
|---|---|---|---|---|---|---|
| | | Cause of fracture | $\sigma'_t$ (kg/mm²) | Cause of fracture | $\sigma'_c$ (kg/mm²) | |
| Unnotched non- | 1 | Fatigue fracture | 49 | Permanent deformation | 92 | 1.88 |
| decarburized | 0.5 | Fatigue | 39 | Permanent | 61.5 | 1.58 |

TABLE 5-continued

| Material | Stress ratio ($\sigma_a/\sigma_m$) | Tension stress side | | Compression stress side | | Allowable stress ratio ($\sigma'_c/\sigma'_t$) |
|---|---|---|---|---|---|---|
| | | Cause of fracture | $\sigma'_t$ (kg/mm²) | Cause of fracture | $\sigma'_c$ (kg/mm²) | |
| round bar | | fracture | | deformation | | |
| | 0.25 | Fatigue fracture | 27.5 | Permanent deformation | 37 | 1.35 |
| Decarburized round bar | 1 | Fatigue fracture | 41.5 | Fatigue fracture | 76 | 1.83 |
| | 0.5 | Fatigue fracture | 34 | Permanent deformation | 61.5 | 1.81 |
| | 0.25 | Fatigue fracture | 25 | Permanent deformation | 37 | 1.48 |
| Decarburized round bar treated by shot peening | 1 | Fatigue fracture | 47 | Fatigue fracture | 81 | 1.72 |
| | 0.5 | Fatigue fracture | 39 | Permanent deformation | 59.5 | 1.53 |
| | 0.25 | Fatigue fracture | 31 | Permanent deformation | 35.5 | 1.15 |

FIGS. 22 and 23 are diagrams of the radius of curvature ($r_c/b$) vs. stress ratio ($\sigma_c/\sigma_t$) of the first and second embodiments, respectively, taking the plate thickness (t/b) as a parameter.

Line KL of FIG. 22 and line PQ of FIG. 23 are limit lines obtained in consideration of variations in the geometrical moment of inertia relative to the radius of curvature, line LM of FIG. 22 and line PQ of FIG. 23 are limit lines of preferred $\sigma_c/\sigma_t$ ratio obtained from the endurance limit diagram, line MN of FIG. 22 and line RS of FIG. 23 are limit lines determined on the basis of the results of calculations of weight reduction, and line KN of FIG. 22 and line PS of FIG. 23 are limit lines of plate thickness ratio (t/b) determined in consideration of the limit of rolling operation of the leaf spring. The preferred embodiments of the present invention fall in the range defined by points K, L, M and N and points P, Q, R and S. More particularly, the plate thickness t is preferred to be 0.05b–0.2b.

The limit of the plate thickness ratio (t/b=0.05) determined in consideration of the limit of the rolling operation of the leaf element is based on the general conception that the rolling for 70 mm wide rolled flat steel strips currently in practical use has a limit at a thickness of 3.5 mm. Thus, the limit of plate thickness ratio (t/b) is placed at 3.5/70=0.05.

FIG. 24 shows a section of another embodiment of the arcuate cross-sectional leaf spring element to be used for the laminated leaf spring according to the present invention, taken along a plane perpendicular to the length of the leaf spring. In this embodiment, the apex portion of a convex surface 11 on the tension stress side, which is formed an arc of a circle concentrically with an arc of a circle forming a concave surface 12 on the compression stress side, is truncated in a plane parallel with a line connecting transverse opposite ends of cross-sectional shape of the spring, providing a truncated plane surface 13.

Figure 26:
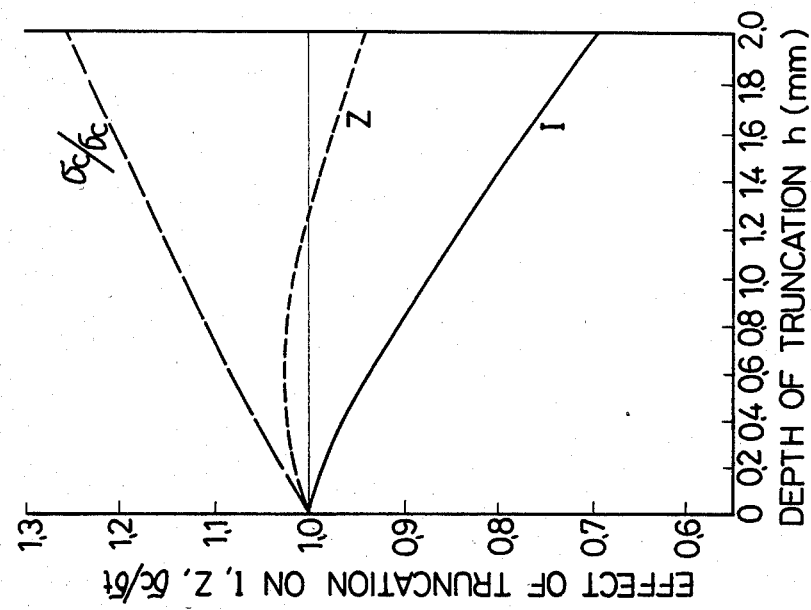
FIGS. 25 and 26 are diagrams showing the influences of the depth of truncation on the geometrical moment of inertia, modulus of section and stress ratio in the above-mentioned embodiment.
Figure 25:
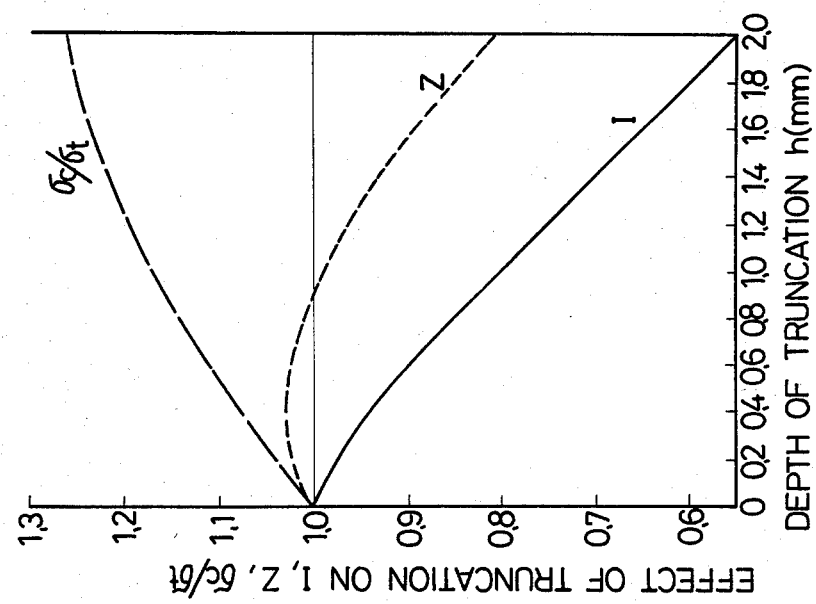
Figure 27:
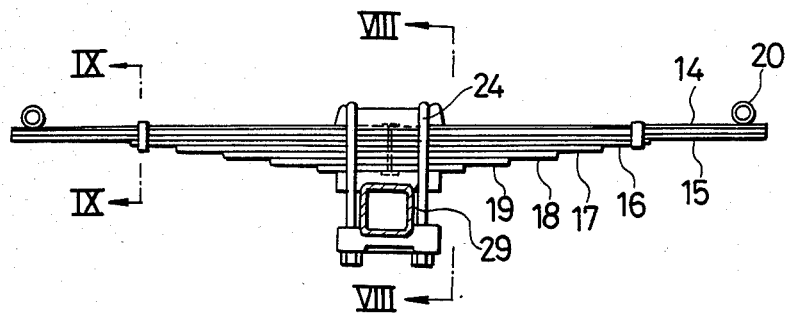
FIG. 27 is a schematic side elevation of an embodiment of the laminated leaf spring according to the present invention.
Figure 28:
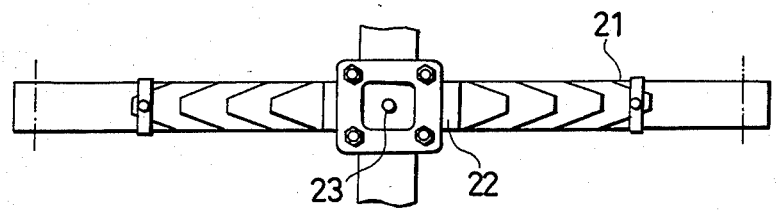
FIG. 28 is a bottom view of the spring of FIG. 27.

FIGS. 25 and 26 are diagrams showing the effect of truncation on the stress ratio $\sigma_c/\sigma_t$, the modulus of section Z and the geometrical moment of inertia I in ratios to 1 which represents the corresponding values of a non-truncated arcuate cross-sectional leaf spring with concentric surfaces 11 and 12 on ordinates of the diagrams against the truncated depth h on abscissa of the diagrams. FIG. 25 shows a situation where the truncated leaf spring has a width b=70 mm, a thickness t=3.5 mm and a radius of transverse center line $r_c=90$ mm and has a truncation in a depth of h mm at the center of surface 11 on the tension stress side. FIG. 26 shows a case where the truncated leaf spring having a width b=70 mm, a thickness t=7 mm and a radius of transverse center line $r_c=90$ mm and provided with a truncation in a depth of h mm at the center of the convex surface on the tension stress side.

From FIGS. 18 and 19, it is understood that the geometrical moment of inertia can be reduced to about 80% of the value of a non-truncated leaf spring, without changing the modulus of section Z in any substantial degree.

It will be appreciated from the foregoing description that the leaf spring element having arcuate cross-section can be treated as an elastic beam and a fatigue strength comparable to that of a round bar can be obtained along with high spring characteristics per unit weight by the shift of the acting point of maximum tension stress toward the apex portion of the convex surface, utilizing the greater margin of fatigue strength on the compression stress side under mean bending moment against the tension stress side. According to the present invention, a number of such leaf element having arcuate cross-sectional shape are clamped together with the concave surfaces of the individual leaf elements overlapped on the convex surfaces of the underlying leaf elements to form a single elastic beam. By making the radius of curvature of the convex surfaces greater than the radius of curvature of the concave surfaces or truncating the apex portions of the respective convex surfaces as shown in FIG. 24, they are contacted with adjacent leaf elements only in the end portions in transverse cross-sections and not in the center portions, preventing fretting and corrosion of the contacting surfaces at the ends of clamped short leaves.

FIGS. 27 to 30 illustrate another embodiment of the present invention employing the above-described leaf elements for a laminated leaf spring of a simple form with no eyelet portions at the main leaf ends, for use on a truck. In these figures, reference numerals 14 to 19 each denote leaf elements of a cross-section with a truncated flat surface 26 on its convex surface as shown in the embodiment of FIG. 24, of which leaf elements 14 and 15 have flat slide areas in the opposite end portions which abut against support member 20 of the vehicle. Leaf elements 16 to 19 have ends trimmed with a diamond point 21 at opposite leaf ends and are tightly connected together by a center bolt 23 through a short leaf 22 which has its convex surface fitted in a concave surface at a longitudinal center portion of lowermost leaf element 19, and clamped and connected to an axle shaft 29 by U-bolts 24. Indicated by 25 is wrapping type rebound clip which has its center portion caulked to an end portion of leaf element 16 clampingly holding leaf elements 14 and 16 at each end portion thereof.

Figure 29:
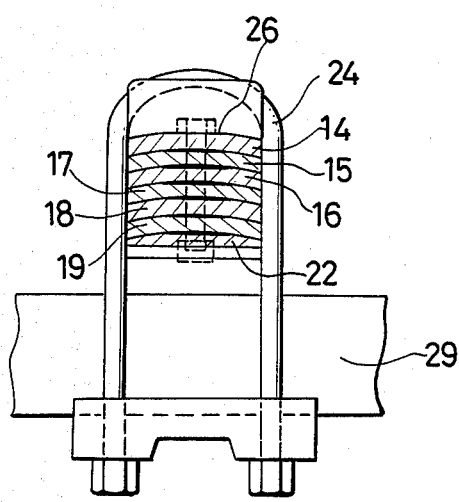
FIG. 29 is a sectional view taken on line VIII—VIII of FIG. 27.
Figure 30:
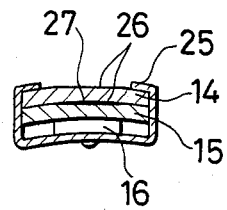
FIG. 30 is a sectional view taken on line IX—IX of FIG. 27.

As clear from FIGS. 29 and 30, the laminated leaf spring of this embodiment is provided with a space 27 between the opposing surfaces of adjacent leaf elements, more particularly, between truncated portion 26 and the opposing concave surface on the inner sides of the contacting side portions of the overlapped convex and concave surfaces. If the radius of curvature of the convex surface is greater than that of the concave surface, the opposing surfaces are contacted with each other by strongly tightening center bolt 23 and U-bolts 24. In this case, the apex portion of the convex surface which is most susceptible to fatigue fracture is kept out of contact with the surface of the adjacent leaf element, preventing drops in fatigue strength due to fretting or corrosion at the end of clamp or at the ends of short leaves.

Figure 31:
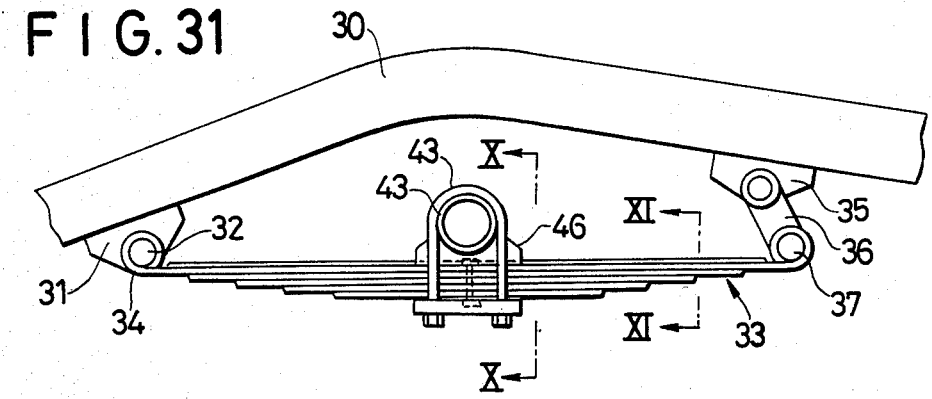
FIG. 31 is a schematic side elevation of still another embodiment according to the present invention.
Figure 33:
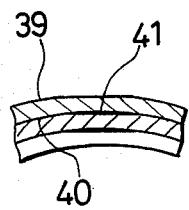
FIGS. 33 through 35 are perspective views of eyelet portions of leaf springs.
Figure 32:
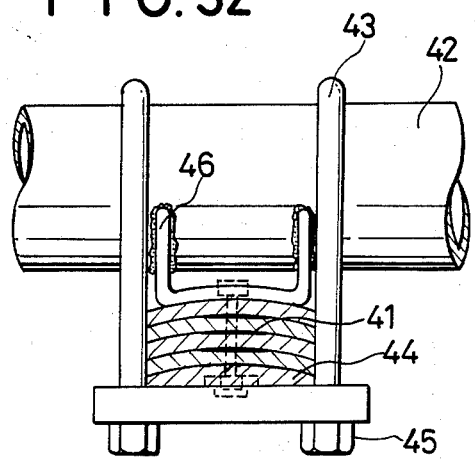
FIG. 32 is a sectional view taken on line X—X of FIG. 31.

FIGS. 31 and 32 illustrate the laminated leaf spring according to the present invention as applied to a suspension of an axle shaft of a motor vehicle, wherein the laminated leaf spring has its convex side attached to an axle shaft 42 and is suspended in position through eyelets 34 at the opposite ends of the main leaf element, one of which is pivotally supported on hanger 31 and the other is supported on one end of a shackle 36 through shafts 32 and 37, respectively.

The respective leaf elements which constitute laminated leaf spring 33 have a convex surface 39 and a concave surface 40 similar to the leaf element shown in FIG. 5. In overlapped state, convex surface 39 which is greater in radius of curvature than concave surface 40 contacts the opposing concave surface only in opposite end portions in cross-section, forming therebetween a closed space 41. On the other hand, welded to axle shaft 42 is a spring mounting seat 46 which has a concave surface on the underside thereof in conformity with the convex surface of the main leaf element. The respective leaf elements of laminated spring 33 which has a spacer 44 abutted on the underside thereof are clamped together and against spring mounting seat 46 on axle shaft 42 by threading nuts 45 on the lower free ends of U-bolts 43 which are mounted astride of axle shaft 42 and passed through holes in spacer 44. Whereupon, the spaces between the adjacent leaf elements are contracted by elastic deformation of the respective leaf element, thereby augmenting the clamping effect. As space 41 is formed between the apex portion of the convex surface and the opposing concave surface even at the ends of clamp by the U-bolts or at the short leaf ends where concentration of load takes place, there is no possibility of fretting or corrosion in the vicinity of the apex portions of the convex surfaces.

Bending loads are imposed on the thus constituted laminated leaf spring 33 by the weight of the vehicle body or by the impacts occurring during the driving operation of the vehicle. The bending load produces tension stress on upper convex surface 39 of laminated leaf spring 33 and compression stress on lower concave surface 40. Since each leaf element of the laminated leaf spring has a higher spring constant than a flat leaf spring of the same sectional dimensions and length and the ratio $\sigma_c/\sigma_t$ of the maximum stress on the compression stress side to that of the tension stress side is greater than one to permit a wider margin on the compression stress side, it is possible to use arcuate cross-sectional leaf elements which are smaller in thickness than the flat leaves and to lower the spring constant. It follows that the arcuate cross-sectional leaf elements can provide a laminated leaf spring of given characteristics in a reduced weight, while ensuring higher durability in comparison with a flat laminated leaf spring.

Further, insofar as the concave surface of the main leaf and the convex surface of a short leaf element are in contacting engagement with each other, they can be held in longitudinally aligned position and prevented from sideward deviations without using clips. In addition, the initial elastic deformation by clamping of the individual leaf elements prevents drops in clamping load or slackening, and the end portions of the short leaf elements are not in contact with the overlying leaf elements at the apex portions of the respective convex surfaces to preclude drops in fatigue strength due to fretting or corrosion of those portions.

Figure 34:
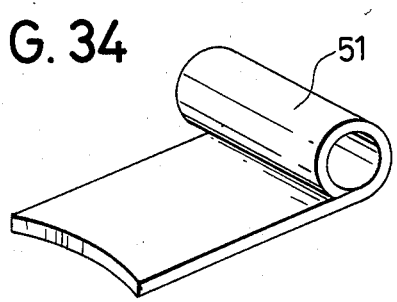
Figure 35A:
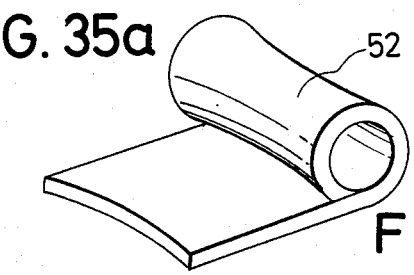
Figure 35B:
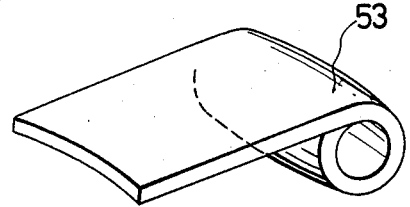

The leaf elements which constitute the laminated leaf spring according to the present invention have an arcuate shape in the transverse cross-section as mentioned hereinbefore, except the flat opposite end portions where cylindrical eyelet portions 34 are to be formed. In this connection, the eyelet portions may be formed into a cylindrical shape indicated at 51 of FIG. 34 similar to the eyelet portions on the conventional flat leaf springs or alternatively into a drum shape illustrated in FIG. 35a or cask shape illustrated in FIG. 35b, if desired. Eyelet portions 52 and 53 shown in FIGS. 35a and 35b are formed in the same sectional shape as the remaining portions of the leaf element so that they have considerably improved fatigue strength and flexural rigidity against moment acting on the eyelet portions, in contrast with the eyelet portions of conventional flat leaves. The manner of rolling the leaf ends into eyelet portions may be a down-roll or an up-roll, or there may be employed Berlin eyelet type.

Another feature of the laminated leaf spring according to the present invention is that the leaf ends with trimmed diamond point (indicated at 21 of FIG. 28) can be formed extremely easily. More particularly, in laminated leaf springs, the width of the respective leaf elements is gradually reduced toward the opposite ends for the purpose of ensuring smooth transfer of load between adjacent leaf elements, for rationalizing the stress distribution at the leaf ends and of reducing the weight of the spring. In order to have smooth load transfer and rationalize the stress distribution in a laminated leaf spring including flat leaf elements, the gradual reduction of width at the leaf ends alone is not sufficient and it is general practice to taper the leaf ends by hot rolling to utilize the effect of reduction in the plate thickness as well.

In contrast, in the laminated spring of the invention using leaf elements of arcuate cross-section, an effect similar to that of tapered ends of flat leaf elements can be obtained simply by obliquely cutting off the corner portions of the respective leaf elements by shearing operation.

Figure 36:
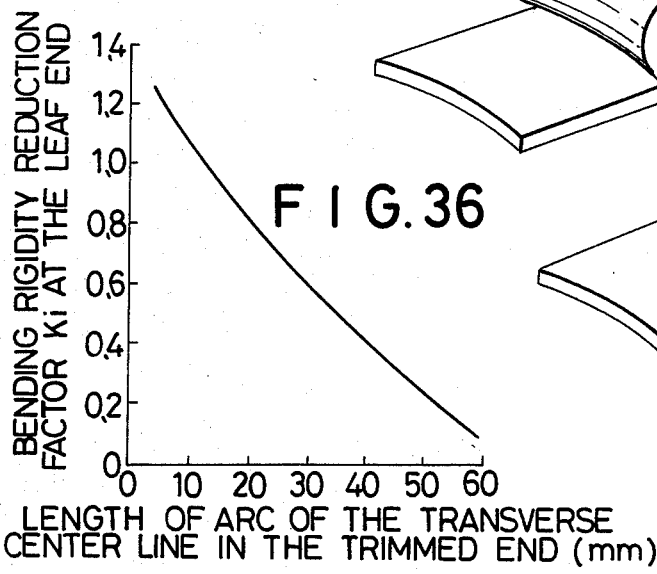
FIG. 36 is a diagram showing variations of bending rigidity reduction factor at the leaf end in relation with the chord length at the leaf ends.

FIG. 36 shows variations in the bending rigidity reduction factor Ki at the leaf end, in relation with variations in the width of trimmed ends of leaf elements of given width and thickness. The bending rigidity reduction factor Ki is a value which indicates the degree of deflection of the trimmed leaf end, and the increment in the deflection due to the formation of the trimmed end is expressed in a dimensionless form on the basis of the deflection of the sectional shape before trimming. The bending rigidity reduction factor Ki=0 indicates the deflection of nontrimmed end and Ki=1 indicates the two times greater deflection as compared with the nontrimmed end. The trimmed ends were formed by obliquely cutting off over a length of 100 mm the opposite corner portions of arcuate cross-sectional leaf elements having a width of 70 mm, a thickness of 7 mm and a transverse center line with a radius of curvature of 85 mm. In the diagram of FIG. 36, the length of trimmed leaf end on the abscissa is represented by the length of arc of the transverse center line in the trimmed end. Table 6 below shows the arc length (WO) of the trimmed end in a ratio as compared to the width (WN) of the leaf element.

TABLE 6

| Arc length of trimmed leaf end (mm) | 10 | 20 | 30 | 40 | 50 | 60 |
|---|---|---|---|---|---|---|
| WO/WN | 0.149 | 0.295 | 0.442 | 0.590 | 0.737 | 0.885 |

As clear from Table 6 and FIG. 36, the narrower the width of the trimmed leaf end, the greater the bending rigidity reduction factor Ki becomes, and the greater the width of the trimmed leaf end, the smaller the bending rigidity reduction factor Ki becomes.

Figure 37:
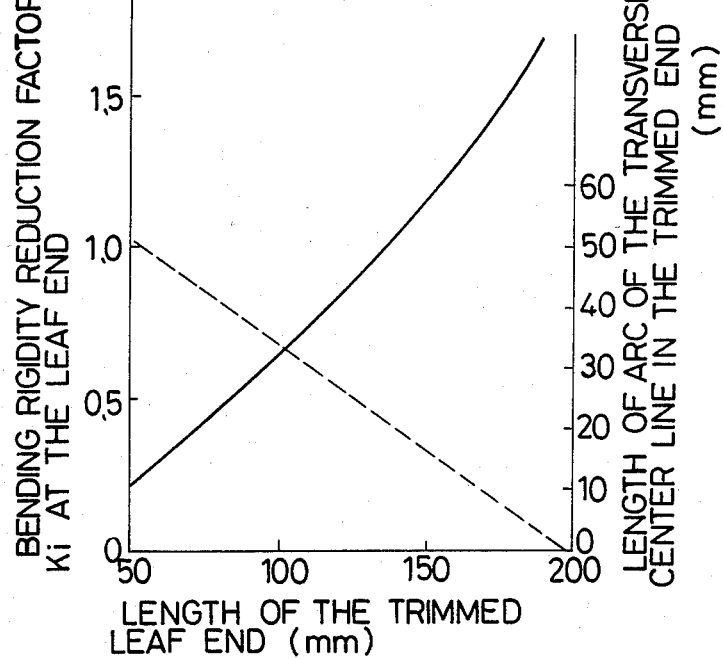
FIG. 37 is a diagram showing variations of the bending reduction factor at the leaf end against the length of the trimmed leaf end.

FIG. 37 shows by solid line variations in the bending rigidity reduction factor Ki against the length of the trimmed leaf end in the case of leaf elements having a width of 69.5 mm, a thickness of 6.2 mm and a transverse center line with a radius of curvature of 81.5 mm in which the opposite side edges of the leaf ends are trimmed at an angle of 10°, along with broken line variations in the width of the trimmed leaf end (length of arc of transverse center line). As clear from FIG. 37, with the same trimming angle of the leaf end, a longer trimmed leaf end has a greater bending rigidity reduction factor Ki.

For comparison, an end trimmed with a diamond point was formed to the ends of arcuate cross-sectional leaf elements having a width of 70 mm, a thickness of 7 mm and an arc of transverse center line with a radius of curvature of 90 mm with a trimming angle of 10° and to the ends of flat leaf elements having a width of 70 mm and a thickness of 7 mm with the same trimming angle of 10° for studying differences in the bending rigidity reduction factor Ki. The dimensions and shapes of the trimmed ends are shown in Table 7 below.

TABLE 7

| | Length of trimmed end | Width of trimmed end | Thickness of trimmed tip end | Ki |
|---|---|---|---|---|
| Arcuate cross-sectional leaf element | 105 mm | 33 mm | 7 mm | 0.54 |
| Flat leaf element | 100 mm | 35 mm | 3.2 mm | 0.86 |

It will be understood from the foregoing description that, when a laminated leaf spring is constituted by a plurality of rolled steel leaf elements of arcuate cross-section, a bending rigidity reduction factor as in the tapered ends of flat leaf springs can be obtained simply by obliquely cutting off the side edges of the leaf ends by a shearing operation.

Following are examples which utilize the laminated leaf spring according to the present invention as a front suspension spring of a small-size truck. According to the design conditions of Table 8 below, laminated leaf springs I and II were produced by the use of leaf elements shown in Table 9. (For comparison, an example of a conventional flat leaf spring under similar design condition as in Table 8 is annexed in Table 9.)

TABLE 8

| Span (no camber) | 1100 mm |
|---|---|
| Spring width | 70 mm |
| Center bolt position | Center of spring |
| Full-length leaves | Two |
| Spring constant | 10.5 ± 1 Kg/mm |
| Normal load | 685 Kg |
| Maximum load | 1335 Kg |

The laminated spring I according to the invention includes arcuate cross-sectional leaf elements all having a width b of 70 mm, a thickness t of 7 mm and a radius of curvature $r_c$ of 90 mm, while the spring II of the invention includes arcuate cross-sectional main leaf elements No. 1 and No. 2 having a width b of 70 mm, a thickness t of 7 mm and a radius of curvature $r_c$ of 90 mm and arcuate cross-sectional leaf elements No. 3 to No. 6 having a width b of 70 mm, a thickness t of 6.5 mm and a radius of curvature $r_c$ of 90 mm. On the other hand, the conventional spring includes flat leaf elements having a width b of 70 mm and a thickness t of 8 mm.

TABLE 9

| | Spring I of the invention | | Spring II of the invention | | Conventional spring | |
|---|---|---|---|---|---|---|
| Leaf No. | Leaf length (mm) | Bending rigidity reduction factor | Leaf length (mm) | Bending rigidity reduction factor | Leaf length (mm) | Bending rigidity reduction factor |
| 1 | 1100 | 0.15 | 1100 | 0.15 | 1100 | 0 |
| 2 | 1100 | 0.54 | 1100 | 0.54 | 1100 | 0.1 |
| 3 | 760 | 0.54 | 760 | 0.54 | 840 | 0.86 |
| 4 | 580 | 0.54 | 580 | 0.54 | 770 | 0.86 |
| 5 | 400 | 0.54 | 400 | 0.54 | 500 | 0.86 |
| 6 | 220 | 0.54 | 220 | 0.54 | 320 | 0.86 |

These laminated springs were each provided with a center clamp of 75 mm across the center bolt prior to endurance test, in which the eyelet portions of each spring were supported on roller for center loading repeated bending test. This is a basic test method for examining the durability of a single body of a laminated leaf spring. With regard to the load condition of the test, the minimum load was set at 100 kg and the maximum load was set at a 65 mm displacement beyond the normal load 685 kg, namely, at (685+spring constant×65 mm) kg in consideration of the service conditions of the springs.

Table 10 shows the characteristics of the laminated leaf spring of conventional type and springs I and II of the arcuate cross-sectional leaf springs according to the present invention, with regard to the spring constant, stress under normal load of 685 kg, and weight, along with the load conditions of the durability test and the number of cycles to failure. Upon comparing the laminated leaf springs of arcuate cross-sectional leaf elements with the laminated leaf spring of flat leaf elements, it is seen that the former and latter are substantially equivalent in durability but the laminated leaf springs of arcuate cross-sectional leaf elements are smaller in weight by about 20% and permit 20% higher stress (at the apex of the convex surface) as compared with the conventional flat leaf spring.

The springs I and II according to the present invention have a slightly greater spring constant than the conventional spring. The spring constant can be adjusted to the value of the conventional laminated spring of the flat elements by varying, especially, the thickness, leaf length and leaf end shape of the structural factors shown in Table 9 or by using truncated arcuate cross-sectional leaf elements (FIG. 24). Therefore, various experiments were conducted on laminated leaf springs similar to the spring I of the invention but having truncated arcuate cross-sectional leaf elements ($b \times t : r_c = 70 \times 7 : 90$, depth of truncation $h \approx 1.0$) instead of simple arcuate cross-sectional leaf elements ($b \times t : r_c = 70 \times 7 : 90$).

The resulting laminated leaf springs of truncated arcuate cross-sectional leaf elements were found to have a spring constant $k = 10.5$ kg/mm equivalent to the conventional spring shown in Tables 9 and 10, which is about 90% of the spring I of the invention. The laminated springs of truncated arcuate cross-sectional leaf elements were slightly lower in stress and weight (about 2%) and had equivalent or higher durability.

TABLE 10

|  | Spring I of the invention | Spring II of the invention | Conventional spring |
|---|---|---|---|
| Spring constant (kg/mm) | 11.7 | 11.0 | 10.6 |
| Stress at clamp end (kg/mm) (under normal load: 685 kg) | 47.5 | 51.2 | 41.0 |
| Weight (kg) | 16.5 | 16.1 | 21.2 |
| Durability test |  |  |  |
| Number of cycles to failure ($\times 10^5$) | 1.36 | 1.30 | 1.46 |
|  | 1.23 | 1.37 | 1.12 |
| Load condition (kg) | 100 → ← 1447 | 100 → ← 1402 | 100 → ← 1335 |

As described hereinbefore, the laminated leaf spring according to the present invention includes leaf elements of arcuate shape in cross-section each having a convex surface on the tension stress side and a concave surface on the compression stress side so that it has a higher flexural rigidity per unit weight as compared with conventional leaf spring having flat leaf elements, while lowering the stress (mean stress, amplitude of stress) of the tension side than that of the compression side to utilize the margin of fatigue strength of the compression side. Therefore, the laminated leaf spring according to the invention has a greater margin of fatigue strength and is reduced in weight as compared with the conventional laminated leaf springs of similar characteristics, using flat leaf elements. In addition, the arcuate cross-sectional leaf elements with the respective convex surface held in overlapped relation with a concave surface of an adjacent leaf element have self-aligning tendency. Since the apex portion of the convex surface is kept clear of the opposing concave surface of the adjacent leaf element to form a space therebetween at least in the center portion in cross-section, thereby protecting the apex portion of the convex surface on the tension stress side, a critical portion of fatigue fracture, against fretting or other problems which will cause lowering of fatigue strength.

Moreover, in a case where the leaf ends are trimmed for smooth load transfer between adjacent leaf elements or for rational stress distribution at the leaf ends, suitable trimmed leaf ends can be obtained simply by obliquely shearing side edges of the leaf ends at a predetermined angle, without tapering the thickness of the trimmed ends as in the conventional flat leaf springs. The respective leaf elements which constitute the laminated leaf spring can be formed by a rolling operation similarly to the conventional flat leaf springs, imparting desired dimensions and a shape to the leaf element by employing one pass rolling with caliber roll in the final stage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter Patent of the United States is:

1. A leaf spring for use in a laminated leaf spring comprising:
   a spring steel plate having a length greater than the width thereof and being mounted to undergo bending deformation in a direction perpendicular to the length thereof, said bending deformation defining a tension side and a compression side for said plate;
   said steel plate having an arcuate shape in the transverse cross-section with a convex surface on said tension side thereof and a concave surface on said compression side thereof, said arcuate shape being uniform along the length thereof and said concave and convex surfaces respectively being defined by an arc of substantially constant radius over the entire width thereof; and
   said steel plate having in said cross-section a width b and a transverse center line forming an arc of a radius $r_c$ with the relation of $$2.0 \geq r_c/b \geq 0.65,$$

thereby shifting the neutral axis in cross-section toward said convex surface so as to reduce tensile stresses during bending of said leaf spring and so as to improve both flexural rigidity and fatigue strength per unit weight of said leaf spring.

2. The leaf spring according to claim 1, wherein said steel plate in said cross-section has a plate thickness t with the relation of $$0.2 \geq t/b \geq 0.05.$$

3. The leaf spring according to claim 2, wherein said steel plate in said cross-section has a convex surface of a radius of curvature $r_o$ and a concave surface of radius of curvature $r_i$ with the relation of $$1.2 \geq r_o/r_i \geq 1.0.$$

4. The leaf spring according to claim 2, wherein said convex surface on said tension side has an apex portion thereof truncated to form a plane surface portion parallel with a line connecting opposite ends of said steel plate in said cross-section, the depth of truncation h relative to the plate thickness t being $$0.35 \geq h/t.$$

5. A laminated leaf spring comprising:
   a plurality of steel plates each having a length greater than the width thereof and being mounted to undergo bending deformation in a direction perpendicular to the length thereof, said bending deformation defining a tension side and a compression side for said plates;

each of said steel plates having an arcuate shape in a transverse cross-section with a convex surface on said tension side thereof and a concave surface on said compression side thereof, said arcuate shape being uniform along the length thereof and said concave and convex surfaces respectively being defined by an arc of substantially constant radius over the entire width thereof; and each of said steel plates having in said cross-section a plate thickness t, a width b and a transverse center line forming an arc of a radius $r_c$ with the relation of $$2.0 \geq r_c/b \geq 0.64,$$

thereby shifting the neutral axis in cross-section toward said convex surface so as to reduce tensile stresses during bending of said leaf spring and so as to improve both flexural rigidity and fatigue strength per unit weight of said leaf spring.

6. The laminated leaf spring according to claim 5, wherein at least one of said steel plates has in said cross-section the plate thickness t with the relation of $$0.2 \geq t/b \geq 0.05.$$

7. The laminated leaf spring according to claim 6, wherein at least one of said steel plates has in said cross-section a convex surface of a radius $r_o$ and a concave surface of a radius $r_i$ with the relation of $$1.2 \geq r_o r_i \geq 1.0.$$

8. The laminated leaf spring according to claim 6, wherein the convex surface on said tension side of said at least one steel plate has an apex portion thereof truncated to form a plane surface portion parallel with a line connecting opposite ends of said steel plate in said cross-section, the depth of truncation h relative to the plate thickness t being $$0.35 \geq h/t.$$

9. The leaf spring of claim 5 wherein said steel plates are placed one on another with a concave surface of one steel plate overlaped on a convex surface of an adjacent steel plate, and wherein the opposing concave and convex surfaces of said adjacent steel plates are contacted with each other on opposite side portions in said cross section, thereby forming a space therebetween at least at the apex portion of each said convex surface.

10. A laminated leaf spring according to claim 9, wherein said steel plates are clamped together at a suitable position within the length thereof with widthwise elastic deformation.

* * * * *